(12) United States Patent
Schuetzle et al.

(10) Patent No.: US 12,168,609 B2
(45) Date of Patent: *Dec. 17, 2024

(54) CATALYTIC REACTOR SYSTEM AND CATALYST FOR CONVERSION OF CAPTURED $CO_2$ AND RENEWABLE $H_2$ INTO LOW-CARBON SYNGAS

(71) Applicant: INFINIUM TECHNOLOGY, LLC, Sacramento, CA (US)

(72) Inventors: Dennis Schuetzle, Grass Valley, CA (US); Robert Schuetzle, Sacramento, CA (US); Orion Hanbury, Sacramento, CA (US); Matthew Caldwell, West Sacramento, CA (US); Glenn McGinnis, Sun Lakes, AZ (US); Ramer Rodriguez, Sacramento, CA (US)

(73) Assignee: Infinium Technology, LLC, Sacramento, CA (US)

( * ) Notice: Subject to any disclaimer, the term of this patent is extended or adjusted under 35 U.S.C. 154(b) by 745 days.

This patent is subject to a terminal disclaimer.

(21) Appl. No.: 17/300,261

(22) Filed: May 3, 2021

(65) Prior Publication Data
US 2022/0348472 A1 Nov. 3, 2022

(51) Int. Cl.
*C01B 32/40* (2017.01)
*B01J 8/04* (2006.01)
(Continued)

(52) U.S. Cl.
CPC .............. *C01B 32/40* (2017.08); *B01J 8/04* (2013.01); *B01J 21/04* (2013.01); *C01B 3/40* (2013.01);
(Continued)

(58) Field of Classification Search
CPC .................................................... C01B 32/40
See application file for complete search history.

(56) References Cited

U.S. PATENT DOCUMENTS

| 7,718,832 B1 | 5/2010 | Schuetzle et al. |
| 8,394,862 B1 | 3/2013 | Schuetzle et al. |
| (Continued) | | |

FOREIGN PATENT DOCUMENTS

| AU | 2015/203898 B2 | 8/2015 |
| GB | 1995/2279583 A | 11/1995 |
| WO | WO 2021/062384 A1 | 4/2021 |

OTHER PUBLICATIONS

Artz, J., et al., "Sustainable conversion of carbon dioxide: an integrated review of catalysis . . . ," Chemical Reviews, vol. 118, pp. 434-504 (2018).

(Continued)

*Primary Examiner* — Stuart L Hendrickson
(74) *Attorney, Agent, or Firm* — McKinney Law Group APC; Jeffrey A. McKinney

(57) ABSTRACT

The present invention describes an improved catalytic reactor system with an improved catalyst that transforms $CO_2$ and low carbon $H_2$ into low-carbon syngas with greater than an 80% $CO_2$ conversion efficiency, resulting in the reduction of plant capital and operating costs compared to processes described in the current art. The inside surface of the adiabatic catalytic reactors is lined with an insulating, non-reactive surface which does not react with the syngas and effect catalyst performance. The improved catalyst is robust, has a high $CO_2$ conversion efficiency, and exhibits little or no degradation in performance over long periods of operation. The low-carbon syngas is used to produce low-carbon fuels (e.g., diesel fuel, jet fuel, gasoline, kerosene, others), chemicals, and other products resulting in a significant (Continued)

reduction in greenhouse gas emissions compared to fossil fuel derived products.

13 Claims, 2 Drawing Sheets

(51) Int. Cl.
     *B01J 21/04*        (2006.01)
     *C01B 3/40*        (2006.01)

(52) U.S. Cl.
    CPC ............ *B01J 2208/00477* (2013.01); *C01B 2203/0233* (2013.01); *C01B 2203/0283* (2013.01); *C01B 2203/085* (2013.01); *C01B 2203/1614* (2013.01); *C01B 2203/1628* (2013.01)

(56) References Cited

U.S. PATENT DOCUMENTS

| | | | |
|---|---|---|---|
| 8,551,434 B1 * | 10/2013 | Mammadov | C01B 32/40 423/220 |
| 8,741,001 B1 | 6/2014 | Schuetzle et al. | |
| 9,090,831 B2 | 7/2015 | Schuetzle et al. | |
| 9,476,002 B1 | 10/2016 | Schuetzle et al. | |
| 9,611,145 B2 | 4/2017 | Schuetzle et al. | |
| 9,631,147 B2 | 4/2017 | Schuetzle et al. | |
| 10,478,806 B2 | 11/2019 | Schuetzle et al. | |
| 11,565,982 B2 * | 1/2023 | Schuetzle | C25B 1/04 |
| 11,597,654 B2 * | 3/2023 | Schuetzle | C01B 5/00 |
| 2008/0032887 A1 | 2/2008 | Ratnasamy et al. | |
| 2009/0313886 A1 | 12/2009 | Hinman et al. | |
| 2010/0105962 A1 | 4/2010 | Mamedov et al. | |
| 2019/0111407 A1 | 4/2019 | Pfeifer et al. | |
| 2022/0298015 A1 | 9/2022 | Mortensen et al. | |
| 2022/0348472 A1 | 11/2022 | Schuetzle et al. | |

OTHER PUBLICATIONS

Bahmanpour, A.M., et al., "Cu-Al spinel as a highly active and catalyst for the reverse water gas shift reaction," ACS Catal., vol. 9, pp. 6243-6251 (2019).
Centi, G., "Opportunities and prospects in the chemical recycling of carbon dioxide to fuels," Catalysis Today, vol. 148, pp. 191-205 (2009).
Chen, P., et al., "Nano-Intermetallic InNi3Co.5 Compound Discovered as Superior Catalyst . . . ," iScience, vol. 17, pp. 315-324 (2019).
Daza, Y.A., et al., "CO2 conversion by reverse water gas shift catalysis: Comparison . . . ," Royal Society of Chem. Adv., 6, 49, pp. 675-49, 691 (2016).
Hepburn, C., et al., "The technological, and economic prospects for CO2 utilization and removal," Nature, vol. 575, pp. 87-97 (2019).
Jiang, Z., et al., "Turning carbon dioxide into fuel," Phil Trans R. Soc A, vol. 368, pp. 3343-3364 (2010).
Li, W., et al., "A short review of recent advances in CO2 hydration to hydrocarbons over heterogeneous catalysts," RSC Adv., vol. 8, pp. 7651 (2018).
Lortie, M., "Reverse water gas shift reaction over supported Cu-Ni . . . ," Dept of Chem. and Biological Engineering M.S. Thesis, University of Ottawa, Canada (2014).
National Academy of Sciences, Chemical Utilization of CO2 into Chemicals and Fuels, National Academies Press, Washington D.C. (2019).
Olah, G. A., "Chemical recycling of carbon dioxide to methanol and dimethyl ether . . . ," J. Org. Chem, vol. 74, pp. 487-498 (2009).
Ruckenstein, E., et al., "Combination of CO2 reforming and partial oxidation of methane . . . ," Industrial & Eng Chem Research, vol. 37, pp. 1744-1747 (1998).
Schutzel, D., et al., "Solar reforming of carbon dioxide to produce diesel fuel," U.S. Department of Energy report #DE-FE0002558 (2010).
Schuetzle, D., et al., "Demonstration of a pilot integrated biofinery . . . ," DOE Tech Report #DE-EE0002876, U.S. Dept Energy (DOE-BTO) Golden CO pp. 1-261 (2015).
Tan, E.C.D, et al., "Reduction of greenhouse gas and criteria pollutant emissions . . . ," Int'l. J. of Energy and Env. Engineering vol. 9, pp. 305-321 (2018).
Vogt, C., et al., "The renaissance of the Sabatier reaction and its applications on earth and in space," Nature Catalysis, vol. 2, pp. 188-197 (2019).
Wang, Y., et al., "High temperature solid oxide H2O/CO2 co-electrolysis for syngas production," Fuel Processing Technology, vol. 161 (2016).
Williamson, D., et al., "N-doped Fe for combined RWGS-FT CO2 hydration," Sustainable Chem. Engineering, vol. 7, pp. 7395-7402 (2019).
Zhu, Q., "Developments on CO2-utilization technologes," Clean Energy, vol. 3, pp. 85-100 (2019).

* cited by examiner

CATALYTIC REACTOR SYSTEM AND CATALYST FOR CONVERSION OF CAPTURED $CO_2$ AND RENEWABLE $H_2$ INTO LOW-CARBON SYNGAS

FIELD OF THE INVENTION

The present invention describes an improved catalytic reactor system, which may include single or tandem reactors, with an improved catalyst that transforms captured $CO_2$ and renewable $H_2$ into low-carbon syngas with greater than an 80% $CO_2$ conversion efficiency. The improved catalyst is robust, has a high $CO_2$ conversion efficiency, and exhibits little or no degradation in performance over long periods of operation. The low-carbon syngas is used to produce low-carbon fuels (e.g., diesel fuel, jet fuel, gasoline, kerosene, others), chemicals (methanol, alcohols, olefins, solvents, others), and other products resulting in a significant reduction in greenhouse gas emissions, compared to fossil fuel derived products.

BACKGROUND OF THE INVENTION

Carbon dioxide is produced by many industrial and biological processes. Carbon dioxide is usually discharged into the atmosphere. However, since carbon dioxide has been identified as a significant greenhouse gas, these carbon dioxide emissions need to be reduced from these processes (Shukla et al, 2019; Schuetzle, 2020). Although carbon dioxide can be used to enhance oil and gas recovery from wells in limited cases as well as is used in small quantities for the beverage industry and other applications, the majority is emitted into the atmosphere. The preferred method to deal with carbon dioxide is to efficiently capture and utilize the carbon dioxide and convert it into useful products such as fuels and chemicals that can displace fuels and chemicals produced from fossil sources such as petroleum and natural gas and therefore lower the total net emissions of carbon dioxide into the atmosphere (Hepburn et al, 2019).

One reaction that has been considered for utilization of carbon dioxide is the Reverse Water Gas Shift (RWGS) reaction which is often referred to as carbon dioxide hydrogenation (Eq. 1).

$$CO_2 + H_2 = CO + H_2O \qquad \text{Eq. 1}$$

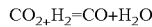

This reaction converts $CO_2$ and $H_2$ to CO and $H_2O$. This reaction is endothermic at room temperature and requires heat to proceed. Elevated temperatures and an efficient catalyst are required for significant carbon dioxide conversion to carbon monoxide with minimal or no coking (carbon formation).

Hydrogen can be produced from many sources including natural gas or more preferably from water via electrolysis or other means (Eq. 2).

$$H_2O = H_2 + \tfrac{1}{2}O_2 \qquad \text{Eq. 2}$$

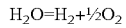

With the CO from the RWGS reaction and $H_2$ from the electrolysis of water, one has the potential for fuels and chemicals production. Mixtures of $H_2$ and CO are called synthesis gas or syngas. Syngas may be used as a feedstock for producing a wide range of chemical products, including liquid and gaseous hydrocarbon fuels, alcohols, acetic acid, dimethyl ether and many other chemical products (Olah, 2009; Centi, 2009; Jian, 2010; Fischer, 2016; Li, 2019; U.S. NAS, 2019).

RWGS Catalysts—The most widely described approach in the current art employs catalytic processes for the conversion of mixtures of $CO_2$ and $H_2$ to syngas. This method is typically referred to as "$CO_2$ hydrogenation" or "reverse water gas shift (RWGS)" (Daza et al, 2016; Vogt et al, 2019). There is a second emerging approach that involves electrolysis processes for the conversion of mixtures of $CO_2$ and $H_2O$ to syngas (Wang et al, 2016).

Many patent applications, patents and publications describe the development of RWGS catalysts for the conversion of $H_2$ and $CO_2$ mixtures to syngas. This art is evaluated with respect to the quality and performance specifications outlined in Table 1.

TABLE 1

Quality and Performance Requirements for the Effective Catalytic Conversion of $H_2/CO_2$ Mixtures to Syngas 1. The catalyst contains low-cost constituents (no [or nominal] rare metals).
2. It can be economically manufactured in multiple ton quantities.
3. The catalyst is robust (e.g., Rockwell hardness greater than Mohr 03-04).
4. It is chemically and physical stable up to about 2,100° F.
5. It can be loaded readily into catalytic reactors (e.g., tubular, or packed bed reactors).
6. The pressure drop from the top to the bottom of the catalytic reactor is acceptable (preferably less than 50 psi).
7. The catalyst activation (e.g., reduction with $H_2$) can be carried out in-situ.
8. The $CO_2$ to CO conversion efficiency is greater than about 65% per pass, but preferably greater than about 75% per pass at space velocities of greater than about 5,000 $hr^{-1}$.
9. The CO production selectivity (from $CO_2$) is greater than about 90%, but preferably greater than about 95%.
10. The catalyst does not coke (e.g., form carbon deposits).
11. It has a long lifetime (less than 0.5% reduction in activity per 1,000 hrs. of operation) and does not require systematic re-activation (reduction).

For commercial economics to be met for a $CO_2$ conversion system, the above metrics are important for a RWGS catalyst system. Prototype RWGS catalysts described in the current art are thus evaluated by employing these quality and performance specifications described in Table 1.

Iwanani et al (1995) developed a catalyst comprised of transition metals with rare metals (such as Ni, Fe, Ru, Rh, Pt, W, Pd, Mo) on zinc oxide for the conversion of $CO_2$ and $H_2$ mixtures to CO. They achieved relatively low conversions of up to 37% without significant loss of catalyst activity after 150 hrs but testing for longer periods was not carried out.

Dupont et al (2003) developed a catalyst consisting of 0.78% $ZnO/0.21\%$ $Cr_2O_3/0.01\%$ NiO for the conversion of an $H_2/CO_2$ (3.5/1.0 v/v) mixture to CO. The $CO_2$ conversion efficiency was 36% with a 92% CO and 8% $CH_4$ selectivity at 950° F., a pressure of 580 psi, and a space velocity of 5.0 $hr^{-1}$. No data was presented on the efficiency of the catalyst with time. This catalyst does not meet any of the criteria outlined in Table 1.

Chen et al (2015) reported the synthesis of a nano intermetallic catalyst ($InNi_3Co_{0.5}$) that proved to be active and selective for the RWGS reaction. The catalyst was fabricated by carburizing the In-Ni intermetallic base which produced dual active sites on the catalyst surface. They achieved a moderate 52-53% $CO_2$ conversion for 150 hrs at 1125° F. at high gas hourly velocities of 30,000 $hr^{-1}$. As based upon its structure, this catalyst may meet criteria #3 and #7. It would be difficult to manufacture this catalyst in multiple ton quantities (criteria #2) and it is not known if can be used commercially in traditional catalytic reactors (criteria #5 and #6). This catalyst does not meet $CO_2$ to CO conversion efficiency requirements (criteria #8) and CO production selectivity (criteria #9). Since this catalyst was only tested for 150 hrs, its stability and lifetime are not known (criteria #4, #10 and #11).

Bahmanpour et al (2019) studied an in situ formed Cu—Al spinel as an active catalyst for the hydrogenation of $CO_2$ with $H_2$ into syngas. They used co-precipitation followed by hydrogen treatment to form the Cu—Al spinel in different weight ratios. A Cu to Al ratio of 4 to 1 was found to be the efficient for $CO_2$ conversion. They maintained a relatively low $CO_2$ conversion rate of 47% at 600° C. at relatively high space velocities and observed no detectable deactivation after a 40-hr. test.

This catalyst meets criteria #1 and it possibly meets criteria #2, #3, #5, #6 and #7. However, copper containing catalysts tend to deactivate over time by sintering at high temperatures. In addition, this catalyst formulation needs to be tested for 1,000 hrs. to assess long-term lifetime (criteria #10).

Daza and Kuhn (2016) developed a La/Sr (3.0/1.0 w/w) catalyst impregnated on an $FeO_3$ substrate. They observed a 16% conversion of $H_2/CO_2$ (1.0/1.0 v/v) to CO with a 95% selectivity at 1,200° F. and 15 psi. The $CO_2$ conversion efficiency and CO selectivity were relatively constant over the period of a 150-hr. test. This catalyst meets criteria #1, #7 and #9 presented in Table 1. Since this catalyst was only run for 150 hrs. its long-term lifetime (#10) is not known.

Table 2 summarizes the above and other art for the catalytic $CO_2$ hydrogenation to CO. In conclusion, none of the catalysts described in the art meet even half of the quality and performance requirements for the effective, commercial conversion of $H_2/CO$ mixtures to syngas. In contrast, the improved catalyst and catalytic conversion system described in this document meets all the requirements presented in Table 1.

TABLE 2

Summary for Catalytic CO2 Hydrogenation to CO

| Reference | Catalyst Formulation | $H_2/CO_2$ ratio | T (° F.) | P (psi) | SV (1.0 khr$^{-1}$) | (−)$CO_2$ (%) | (+)CO (%) | (+)$CH_4$ (%) | Time (hrs.) | (−)$CO_2$/dt (%/100 hr) |
|---|---|---|---|---|---|---|---|---|---|---|
| Chen (2003) | 9% Cu/1.9% K/SiO$_2$ | 1.0 | 1,100 | 15 | 0.4 | 13 | 13 | 0 | nd | nd |
| Dupont (2003) | 0.78% ZnO/0.21% Cr$_2$O$_3$/0.01% NiO | 3.5 | 950 | 300 | 5.0 | 36 | 33 | 3 | nd | nd |
| Kim (2012) | 1% Pt/TiO$_2$ | 1.4 | 1,600 | 15 | 0.4 | 48 | 48 | 0 | nd | nd |
| Kim (2012) | 1% Pt/Al$_2$O$_3$ | 1.4 | 1,100 | 15 | 0.04 | 42 | 42 | 0 | nd | nd |
| Wang (2013) | Ni/CeO$_2$ | 1.0 | 1,400 | 15 | tbd | 40 | 40 | 0 | nd | nd |
| Lu (2014) | 3% NiO | 1.0 | 1,400 | 15 | tbd | 45 | 45 | 0 | nd | nd |
| Kim (2014) | 3% NiO/CeO$_2$ | 1.0 | 1,100 | 15 | 2.7 | 38 | 32 | 6 | nd | nd |
| Lortie (2014) | 10% CuNi$_4$ Solid Solution on Sm/CeO$_2$ | 1.0 | 1,300 | 15 | 282 | 38 | 38 | 0 | 48 | nd |
| Lortie (2014) | 10% 1% Pt on Sm/CeO$_2$ | 1.0 | 1,300 | 15 | 282 | 40 | 40 | 0 | 48 | 1.0 |
| Landau (2015) | Fe/Fe—Al$_2$O$_3$ Spinel | 1.0 | 950 | na | 0.02 | 36 | 13 | 9 | nd | nd |
| Sun (2015) | 10% Ni/Ce/ZrO | tbd | 1,400 | 15 | tbd | 49 | 49 | 0 | 80 | <1.0 |
| Daza (2016) | 1.0 La/0.75 Sr/0.25 FeO$_3$ | 1.0 | 1,000 | 15 | 130 | 16 | 15 | 1 | 155 | <1.0 |
| Zhang (2016) | Cu/Mo$_2$C | 3.0 | 1,100 | 15 | 300 | 38 | 36 | 2 | 40 | 100.0 |
| Goncalves (2017) | 2.4% Ni/SiO$_2$ sputter deposited | 4.0 | 1,500 | 15 | na | 73 | 73 | 0 | 40 | nd |
| Goncalves (2017) | 2.4% Ni/SiO$_2$ Impregnated | 4.0 | 1,500 | 15 | na | 57 | 57 | 0 | 40 | nd |
| Pastor (2017) | Cs/Fe/Cu/Al$_2$O$_3$ | 4.0 | 1,400 | 15 | 25 | 70 | 70 | 0 | 50 | nd |
| Choi (2017) | 4% Pd, Cu, Ni or Ag on Al$_2$O$_3$ | 3.0 | 1,475 | 15 | 12 | 68 | 68 | 0 | 10 | nd |
| Alames (2018) | 10% Cu/Al$_2$O$_3$ | 1.0 | 850 | 15 | 76 | 3 | 2 | 1 | 6 | nd |
| Alames (2018) | 10% Cu/MgO | 1.0 | 850 | 15 | 76 | 10 | 3 | 7 | 6 | nd |
| Alames (2018) | 5% Cu/MgO | 1.0 | 850 | 15 | 76 | 20 | 15 | 5 | 6 | nd |
| Alames (2018) | 10% Cu/MgO | 1.0 | 1,475 | 15 | 76 | 48 | 48 | 0 | 6 | nd |
| Pastor (2018) | 5% Cs/15% Fe on Al$_2$O$_3$ | 4.0 | 1,475 | 15 | 12 | 75 | 75 | 0 | 40 | nd |
| Bahmanpour (2019) | 4% Cu/Cu—Al$_2$O$_3$ Spinel | 1.0 | 1,100 | 15 | 300 | 47 | 47 | 0 | 40 | 7.0 |
| Bahmanpour (2019) | 6% Cu/Al$_2$O$_3$ | 1.0 | 1,100 | 15 | 30 | 47 | 47 | 0 | 40 | 23.0 |
| Bahmanpour (2019) | 4% Cu/ZnO/Al$_2$O$_3$ | 1.0 | 1,100 | 15 | 30 | 33 | 33 | 0 | 40 | 32.0 |
| Chen (2019) | InNi$_3$C$_{0.5}$ | 3.0 | 1,100 | 15 | 145 | 22 | 53 | 50 | 3 | 150 | 1.3 |
| Ranjbar (2019) | 1.5% Ni/MgAl$_2$O$_4$ | 1.0 | 1,300 | 15 | 24 | 40 | 38 | 2 | 15 | 1.3 |
| Yang (2019) | Ni/Ce—Al | 4.0 | 1,400 | 15 | 30 | 67 | 61 | 6 | 48 | nd |

RWGS Catalytic Reactors, Art—The use of catalytic reactors, including single reactors and tandem reactors, has been used for many decades for boosting feedstock conversion efficiencies, improving yields, and increasing product selectivities (Du et al, 2019; Wikipedia, 2021; Repasky et al, 2021) and therefore the use of tandem reactors for RWGS are well known for those working in the art these tandem reactors are not considered an innovative improvement.

The catalytic reactor described in this document has been improved by adding an insulating, non-reactive surface to the interior catalyst walls which do not react with the syngas and effect catalyst performance. Other catalytic reactor systems and configurations are described that work with the RWGS catalyst.

Figure 1:
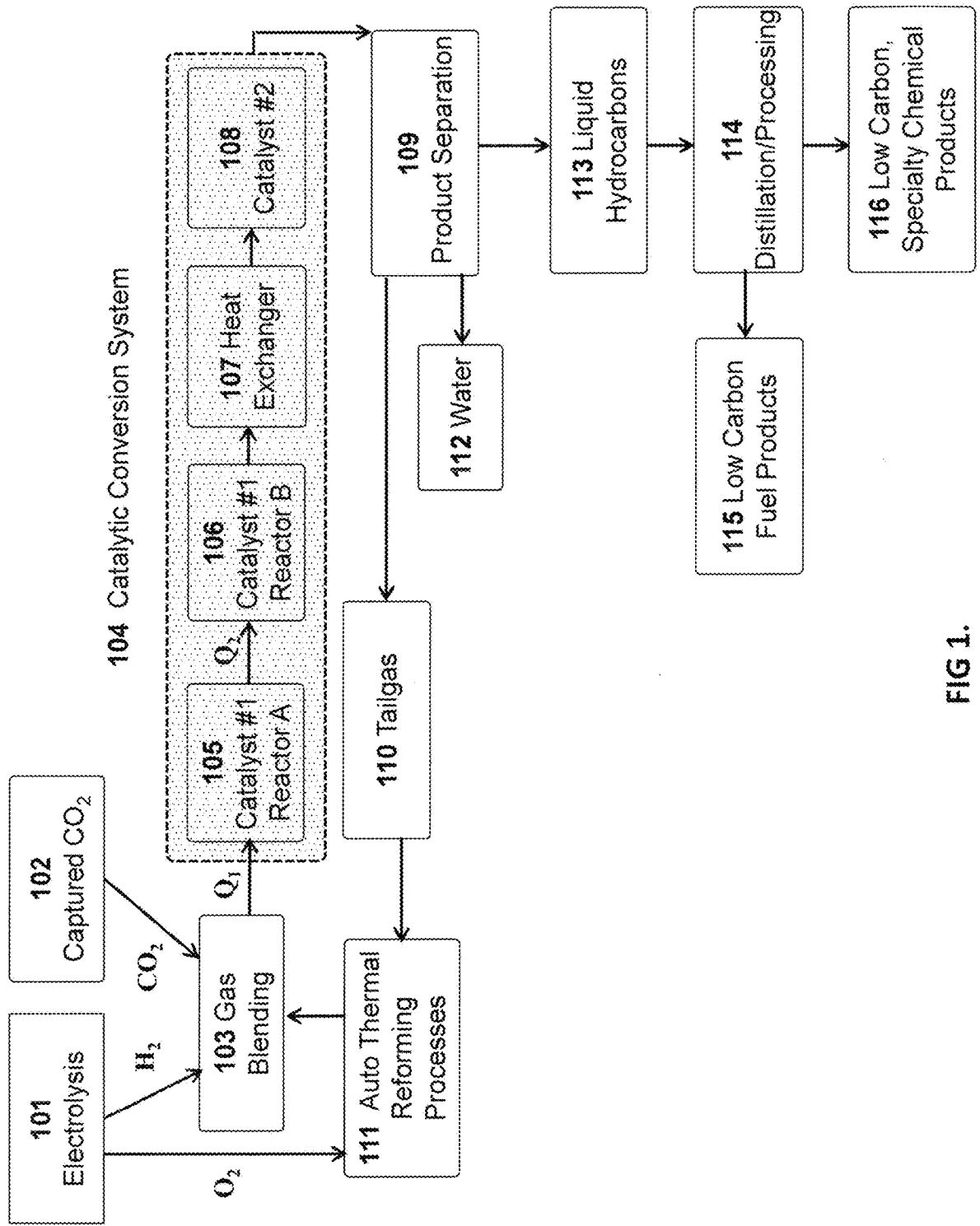
FIG. 1 illustrates the process flow diagram for the conversion of $H_2$ and $CO_2$ to low carbon fuels and chemical products. The primary subsystems include: 1) the electrolysis system to produce $H_2$ and $O_2$ from water 101; 2) captured $CO_2$ 102; 3) the catalytic conversion system 104 which includes the improved catalyst (catalyst #1) in tandem catalytic reactors A 105 and B 106 that efficiently produces syngas from the $H_2/CO_2$ mixture. Catalyst #2 108 produces liquid hydrocarbons (or other chemical products) from the syngas. The production of low carbon fuel products and high-value chemical products are separated and/or purified by distillation and/or other separation processes 114.

The general arrangement of the unique catalytic conversion system 104 is illustrated in FIG. 1. The mixture of $H_2$ and $CO_2$ 103 is heated ($Q_1$) to the desired operating temperature before entry into reactor A 105 that contains the improved RWGS catalyst (catalyst #1). The reactant streams may be heated as a blended gas or heated individually. Since the catalytic conversion of $H_2$ and CO is endothermic, the temperature of the gases exiting react A will be lower than the entry temperature. Therefore, the gases are reheated ($Q_2$) to desired operating temperature before entry into reactor B 106. Configurations of the system may also include using a single reactor system that is heated throughout the length of the reactor such that the temperature is kept nearly isothermal. Following the RWGS reactor system(s), a heat exchanger is used to reduce the temperature of the gases from reactor B to the desired operating temperature of catalyst #2 108 for production of fuels and chemicals. Water is knocked out during this step.

Thermal design and optimization for RWGS reactors is particularly important to the commercial synthesis of fuels and chemicals. This tandem reactor design provides for about 80% or greater conversion of $CO_2$ to CO and which eliminates the need for recirculation of the product gas/syngas stream before it enters the next stage of the process.

Figure 2:
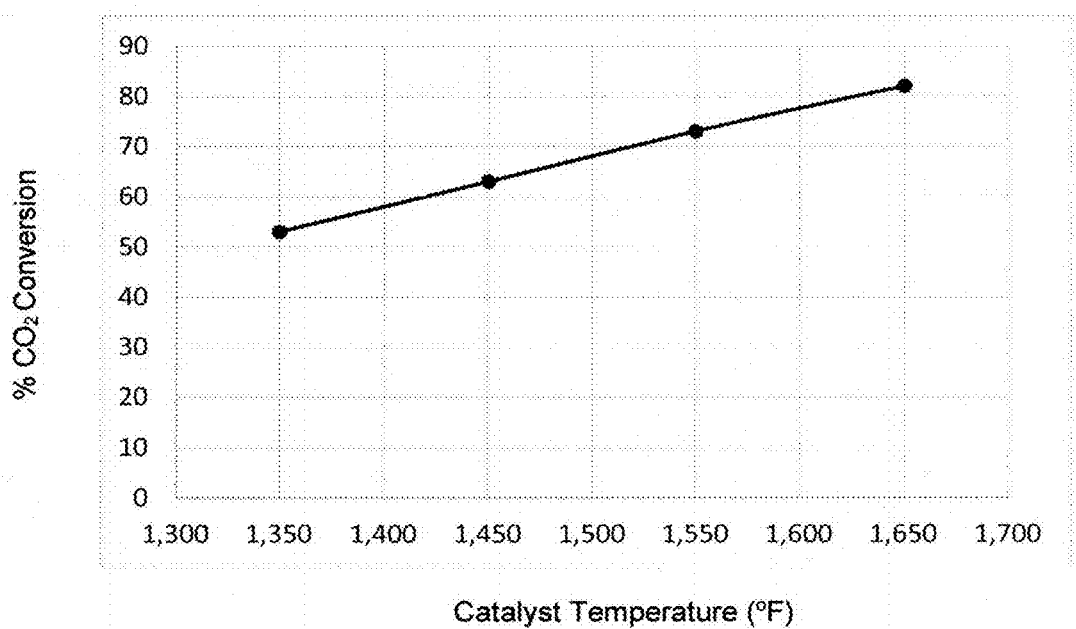

FIG. 2 illustrates $CO_2$ conversion efficiency for the improved catalyst as a function of catalyst average temperature ($H_2$/CO ratio: 3.4/1.0; pressure: 300 psi; space velocity: 20,000 $hr^{-1}$).

SUMMARY OF THE INVENTION

This invention relates to a process for the conversion of a feed gas comprising $H_2$ and $CO_2$ mixtures to syngas comprising various ratios of $H_2$ and CO. The feed gas is pre-heated to an inlet temperature greater than 1500° F., or preferably greater than 1600° F., to produce a heated feed gas. Feed gases may be heated individually and then blended or blended and then heated together. The electrical pre-heater ($Q_1$) uses renewable electricity to heat the feed gas but also may use a fired heater configuration. The heated feed gas is sent to an improved RWGS catalyst in a first catalytic reactor. This improved catalyst consists of the impregnation of one or more Group I and Group 2 metals on a metal alumina spinel. The gases from the first catalytic reactor are reheated ($Q_2$) to the desired RWGS catalyst operating temperature before being sent to a second RWGS catalytic reactor containing the improved catalyst. The resulting $CO_2$ conversion efficiency is better than about 80% with a CO production selectivity of greater than about 95%.

DETAILED DESCRIPTION OF THE INVENTION

Renewable $H_2$ 101 is produced by electrolysis of water using renewable power.

$$H_2O = H_2 + \tfrac{1}{2}O_2 \qquad \text{Eq. 1}$$

Other sources of low carbon or renewable $H_2$ may also be used including renewable $H_2$ that can also be produced by the steam reforming of biomass to produce syngas with an $H_2$/CO ratio of about 2.0 (Schuetzle et al, 2015), or from flare gas that consists primarily of methane (Equation 2) (Tan et al, 2018).

$$CH_4 + H_2O = 3H_2 + CO \qquad \text{Eq. 2}$$

$CO_2$ can be captured from numerous industrial and natural sources. $CO_2$ is often found in natural gas deposits. It is emitted from many biological processes such as anaerobic digestion. Many other processes (e.g., power plants, cement plants, ethanol production, petroleum refining, chemical plants, etc.) produce $CO_2$ which is usually discharged into the atmosphere. $CO_2$ can also be captured from the atmosphere. $CO_2$ can be captured from these biological, industrial, and atmospheric processes via many known technologies and can be used as feedstock for the invention (Hepburn et al (2019). $H_2$ and $CO_2$ are blended in the desired volume ratio to form stream 103 in FIG. 1. The ratio of $H_2/CO_2$ is between 2.5-4.0 and more preferably between 3.0-3.7. This gas blend is then heated indirectly to a temperature of greater than 1,500° F. and preferably greater than 1,600° F. It is important that this heating is carried out using renewable power or other renewable resources to achieve acceptable carbon intensities for the resulting end products.

There are numerous ways that the electrical heating of the feed gas can be done. One way is using an electrically heated radiant furnace. In this embodiment, at least a portion of the gas blend passes through a heating coil in a furnace. In the furnace, the heating coil is surrounded by radiant electric heating elements. In another embodiment of the invention, the gas is passed directly over heating elements whereby the gas is heated by convective heat transfer. The electric heating elements can be made from numerous materials. The most common heating elements are nickel chromium alloys. These elements may be in rolled strips or wires or cast as zig zag patterns. The elements are fixed into an insulated vessel where ceramic fiber is generally used for insulation. The radiant elements may be divided into zones to give a controlled pattern of heating. Multiple coils and multiple zones may be needed to provide the energy to produce a heated feed gas. Radiant furnaces require proper design of the heating elements and fluid coils to ensure good view factors and good heat transfer. The electricity usage by the radiant furnace should be as low as possible. The electricity usage by the radiant furnace is less than 0.5 MWh (megawatt-hour) electricity/metric ton (MT) of $CO_2$ in the feed gas; more preferably less than 0.40 MWh/MT $CO_2$; and even more preferably less than 0.20 MWh/MT $CO_2$.

Catalyst reactors A and B are constructed of high-temperature Inconel steel or Hastelloy which have been insulated to limit heat losses. The advantage of this tandem reactor design is that catalytic reactors A and B only need to be insulated and not heated. The only gas heating required is before catalyst reactor A and reactor B. In an alternate configuration, a single catalytic reactor system may also be used whereby heaters are used in the reactor system to keep the temperature in the system near isothermal and to maximize conversion. Reactor systems may be packed vessels or multi-tubular reactor systems both well known in the art.

The construction of the catalytic reactors with stainless steel or ceramic materials that contain silica are not acceptable since the silica has been found to react with the syngas to produce silicon hydride which then deposits siliicates on the catalysts, significantly reducing the lifetime and efficiency of the catalyst. Stainless steel is also not acceptable since it reacts with the syngas. It is preferred that the catalyst reactors are manufactured from high-temperature Inconel or Hastelloy.

The inside surface of the Inconel or Hastelloy is lined with an insulating, non-reactive surface coating which does not react with the syngas and effect catalyst performance. Examples of acceptable surface coatings include spinels such as magnesium aluminate and yttria-stabilized zirconia (YSZ). These coatings may be applied using thermal spray processes.

The improved RWGS catalyst (Catalyst #1 in Reactor A 105 and Reactor B 106) is located inside the Catalytic Conversion System 104. This catalyst can be in the form of granules, pellets, spheres, trilobes, quadra-lobes, monoliths, or any other engineered shape to minimize pressure drop across the reactor. Ideally the shape and particle size of the catalyst particles is managed such that pressure drop across the reactor is less than 50 psi and more preferably less than 20 psi. The size of the catalyst form can have a characteristic dimension of between 1 mm to 10 mm. The catalyst particle is a porous material with an internal surface area greater than about 15 $m^2/g$ and more preferably greater than about 30 $m^2/g$.

The improved catalyst used in this improved process comprises a metal alumina spinel impregnated with one or more elements at a combined concentration of between 1 to 35 parts-by-weight, and wherein the metal alumina spinel is selected from a group consisting of magnesium aluminate, calcium aluminate, strontium aluminate, potassium aluminate and sodium aluminate, and in which the impregnated elements are selected from a group consisting of Ba, Ca, Co, Fe, Mg, Ni and Zn.

The Weight Hourly Space Velocity (WHSV), which is the mass flow rate of reactants ($H_2+CO_2$) per hour divided by the mass of the catalyst in Reactors A and B, is between 1,000 and 50,000 $hr^1$ and more preferably between 10,000 and 30,000 $hr^{-1}$.

The gas leaving the main reactor vessel is the product gas. The product gas comprises syngas ($H_2/CO$ mixture), unreacted $CO_2$ and $H_2O$. Additionally, the product gas may also comprise a small amount of methane ($CH_4$) that was produced in the main reactor vessel by a side reaction. In one embodiment, methane production is preferably less than 10% more preferably less than 5%, and much more preferably less than 1%.

The syngas can be used in a variety of ways at this point in the process. The syngas can be cooled and compressed using a Heat Exchanger 107, as specified by the catalyst 108 employed to produce fuels and chemicals.

Following production of fuels or chemicals, products (including a methane rich tailgas) are separated 109 and taigas is recycled for further conversion to an autothermal reformer 111. The autothermal reformer uses oxygen produced from the electrolysis step 101.

Liquid hydrocarbon products 113 may be distilled and/or processed 114 to produce low carbon fuels such as diesel, naphtha, kerosene, jet fuel, gasoline or other fuel products or low carbon specialty chemical products such as solvents, waxes, n-paraffins, olefins and other products.

EXAMPLE

The following are examples for the conversion of $H_2$ and $CO_2$ mixtures to syngas using various catalytic conversion system designs and operational specifications.

Example #1—In this example, catalytic Reactors A 105 and Reactor B 106 are identical in size and operated under the same conditions of pressure, temperature and space velocity. The $H_2/CO_2$ blend (3.4/1.0 v/v) is heated to 1,650° F., compressed to 300 psi and fed into catalytic reactor A 105 at a space velocity of about 17,000 $hr^{-1}$.

Since the catalytic conversion of the $H_2/CO_2$ mixture syngas is endothermic, the temperature of the gas reactants and products are decreased, and the $CO_2$ conversion efficiency is reduced as the gas passes through the reactor. FIG. 1 illustrates the relationship between $CO_2$ conversion efficiency and gas temperature. The $CO_2$ conversion efficiency at the inlet of the catalyst bed is 82% with a CO production selectivity greater than 99%.

The exit temperature of the unreacted and products gases from Reactor A will be about will be about 1,375° F. Therefore, the average gas temperature in Reactor A is about 1,510° F. The average $CO_2$ conversion efficiency is about 68% at this average catalyst bed temperature. The gases exiting Reactor A contain about 32% of un-converted $CO_2$. The gas exiting Reactor A is then re-heated ($Q_2$ in FIGS. 1) to 1,650° F. before entry into Reactor B. The exit temperature of the gases from reactor B is about 1,615° F. with an average $CO_2$ conversion efficiency of 78%. As a result, of this improved tandem reactor design, the $CO_2$ conversion efficiency is greater than 80%. Thus, recycling of the catalyst tail-gases is not required. The resulting syngas composition (dry) exiting from Reactor B is comprised of 54% $H_2$, 27% CO and 19% $CO_2$.

Therefore, the ratio of 2.0/1.0 for $H_2/CO$ is ideal for the direct production of fuels (Schuetzle et al patents, 2013, 2014, 2015, 2016, 2017, 2019), ethanol (Schuetzle et al patent, 2010); methanol (NEIL, 2021) and other products.

U.S. Patent Application Documents

| 2003/0113244 A1 | June 2003 | DuPont et al |
|---|---|---|

U.S. Patent Documents

| 7,718,832 B1 | May 2010 | Schuetzle et al |
|---|---|---|
| 8,394,862 B1 | March 2013 | Schuetzle et al |
| 8,741,001 B1 | June 2014 | Schuetzle et al |
| 9,090,831 B2 | July 2015 | Schuetzle et al |
| 9,476,002 B1 | October 2016 | Schuetzle et al |
| 9,611,145 B1 | April 2017 | Schuetzle et al |
| 9,631,147 B1 | April 2017 | Schuetzle et al |
| 10,478,806 B1 | November 2019 | Schuetzle et al |

Foreign Patent Documents

| | | |
|---|---|---|
| GB 1995/2279583 A | 11/995 | Iwanani et al |
| AU 2015/203898 B2 | July 2015 | Landau et al |
| WO 2021/062384 A1 | May 2021 | Repasky et al |

Other Publications

Artz, J., Muller, T. E., Thenert, K., Kleinekorte, J., Meys, R., Sternberg, A., Bardow, A, Leitner, W: Sustainable conversion of carbon dioxide: An integrated review of catalysis and life cycle assessment. Chemical Reviews, 118, 434-504 (2018).

Bahmanpour, A. M., Heroguel, F., Kilic, M., Baranowski, C. J., Artiglia, L.: Cu—Al spinel as a highly active and catalyst for the reverse water gas shift reaction. ACS Catal., 9, 6243-6251 (2019).

Centi, G., Perathoner, S.: Opportunities and prospects in the chemical recycling of carbon dioxide to fuels. Catalysis Today, 148, 191-205 (2009).

Chen, P., Zhao, Guofeng, Z., Xue-Rong, J., Zhu, J. D., Lu, Y.: Catalytic technology for carbon dioxide reforming of methane to syngas, iScience 17, 315-324 (2019).

Daza, Y. A., Kuhn, J. N.: $CO_2$ conversion by reverse water gas shift catalysis: Comparison of catalysts, mechanisms, and their consequences for $CO_2$ conversion to liquid fuels, Royal Society of Chemistry Advances, 6, 49, 675-49,691 (2016).

Fischer, N., Claeys, M., Van Steen, E., Niemantsverdriet, H., Vosloo, M.: Syngas convention — fuels and chemicals from synthesis gas: state of the art, 2, 1-200 (2016).

Hepburn, C., Adlen, E., Beddington, J., Carter, E. A., Fuss, S., Dowell, N. M., Minx, J. C., Smith, P., Williams, C. K.: The technological and economic prospects for $CO_2$ utilization and removal, Nature, 575, 87-97 (2019).

Jiang, Z., Xiao, T., Kuznetsov, V. L., Edwards, P. P.: Turning carbon dioxide into fuel. Phil. Trans. R. Soc. A, 368, 3343-3364 (2010).

Li, W., Wang, H., Jiang, X., Zhu, J., Liu, Z., Guo, X., Song, C.: A short review of recent advances in $CO_2$ hydrogenation to hydrocarbons over heterogeneous catalysts, RSC Adv., 8, 7651 (2018).

Lortie, M.: Reverse water gas shift reaction over supported Cu-Ni nanoparticle catalysts, Department of Chemical and Biological Engineering M.S. Thesis, University of Ottawa, Ottawa, Canada (2014).

National Academy of Sciences, Chemical Utilization of $CO_2$ into Chemicals and Fuels, Gaseous Carbon Waste Streams Utilization: Status and Research Needs, National Academies Press, Washington D.C. (2019).

National Energy Technology Laboratory: Syngas conversion to methanol, www.netl.doe.gov) (2021).

Olah, G. A., Goeppert, A., Surya Prakash, G. K.: Chemical recycling of carbon dioxide to methanol and dimethyl ether - from greenhouse gas to renewable, environmentally carbon neutral fuels and synthetic hydrocarbons. J. Org. Chem., 74, 487-498 (2009).

Ruckenstein, E., Hu, Y. H.: Combination of $CO_2$ reforming and partial oxidation of methane over NiO/MgO Solid Solution, Industrial & Engineering Chemistry Research, 37, 1744-1747 (1998).

Schuetzle, D., Tamblyn, G., Caldwell, M., Schuetzle, R.: Solar reforming of carbon dioxide to produce diesel fuel. U.S. Department of Energy report #DE-FE0002558 (2010).

Schuetzle, D., Tamblyn, G., Caldwell, M., Hanbury, O., Schuetzle, R., Rodriquez, R., Johnson, A., Deichert, F., Jorgensen, R., Struble, D: Demonstration of a pilot integrated biorefinery for the efficient, direct conversion of biomass to diesel fuel. DOE Technical Report #DE-EE0002876, U.S. Department of Energy Bioenergy Technologies Office (DOE-BTO), Golden, Colo., 1-261 (May 2015) (www.researchgate.net)

Schuetzle, D.: Historical and predicted global climate changes and some potential accelerated climate moderation approaches, 2018 Global Climate Action Summit, San Francisco, Calif., 1-42 (2020) (www.researchgate.net).

Shukla, P.R. et al: Climate Change and Land: an IPCC special report on climate change, desertification, land degradation, sustainable land management, food security, and greenhouse gas fluxes in terrestrial ecosystems, 2019 Intergovernmental Panel on Climate Change (2019) (www.ipcc.ch)

Tan, E. C. D., Schuetzle, D., Zhang, Y., Hanbury, O., Schuetzle, R.: Reduction of greenhouse gas and criteria pollutant emissions by direct conversion of associated flare gas to synthetic fuels at oil wellheads, International Journal of Energy and Environmental Engineering, 9: 305-321 (2018)

Vogt, C., Monai, M., Kramer, G. J., Weckhuysen, B. M.: The renaissance of the Sabatier reaction and its applications on Earth and in space, Nature Catalysis, 2, 188-197 (2019).

Wang, Y., Liu, T., Lei, L., Chen, F.: High temperature solid oxide $H_2O$/$CO_2$ co-electrolysis for syngas production, Fuel Processing Technology, 161 (2016).

Williamson, D., Herdes, C., Torrente-Murciano, L., Jones, M., Mattia, D.: N-doped Fe for combined RWGS-FT $CO_2$ hydrogenation, 7, 7395-7402, ACS Sustainable Chem. Engineering (2019).

Zhu, Q.: Developments on $CO_2$-utilization technologies, Clean Energy, 3, 85-100 (2019).

The invention claimed is:

1. A process for producing syngas, wherein the process comprises: introducing a mixture of $H_2$ and $CO_2$ to a first catalytic reactor that has an inside surface and an outside surface, wherein the inside surface of the first catalytic reactor is coated with magnesium aluminate or yttria-stabilized zirconia which does not react with $H_2$, CO or $CO_2$, and wherein the outside surface of the first catalytic reactor has been insulated to minimize heat loss for adiabatic operation thereby producing syngas.

2. The process of claim 1, wherein: the first catalytic reactor is used in tandem with a second catalytic reactor that has an inside surface and an outside surface, wherein the inside surface of the second catalytic reactor is coated with magnesium aluminate or yttria-stabilized zirconia that does not react with $H_2$, CO or $CO_2$, and wherein the outside surface of the second catalytic reactor has been insulated to minimize heat loss for adiabatic operation wherein a mixture of CO, $H_2$ and $CO_2$ exits the first catalytic reactor and is introduced to the second reactor so that further conversion of $CO_2$ and $H_2$ to syngas occurs, resulting in a $CO_2$ conversion efficiency between 80 percent and 100 percent.

3. The process of claim 2, wherein the first and second catalytic reactors are operated at 150 to 350 psi.

4. The process of claim 2, wherein the first and second catalytic reactors are operated at 1,600 to 1,700° F.

5. The process of claim 2, wherein the second catalytic reactor is operated at a pressure within 20 psi of the first reactor.

6. The process of claim 1, wherein the mixture of H2 and CO2 introduced into the first reactor further comprises methane.

7. The process of claim 6, wherein between 80 percent and 100 percent of the methane is converted to CO.

8. The process of claim 1, wherein the catalyst in the first catalytic reactor is comprised of a metal alumina spinel impregnated with one or more elements at a combined concentration between 1 and 35 parts-by-weight, and wherein the metal alumina spinel is selected from the group consisting of magnesium aluminate, calcium aluminate, strontium aluminate, potassium aluminate and sodium aluminate, and wherein one or more of the elements is selected from a group consisting of Ba, Ca, Co. Fe, Mg. Ni and Zn.

9. The process of claim 1, wherein the volume ration of $H_2$ to $CO_2$ introduced into the first reactor is 1.5 to 5.0.

10. The process of claim 1, wherein the CO production selectivity from $CO_2$ is between 90 percent and 100 percent.

11. The process of claim 1, wherein the $CO_2$ to CO conversion efficiency degrades between 0 percent and 1 percent over 1,000 hours.

12. The process of claim 1, wherein a preheater is used to heat the $H_2$ and $CO_2$ before it is introduced into the first catalytic reactor uses less than 0.6 MWh of renewable electricity per metric ton of $CO_2$ introduced into the first catalytic reactor.

13. The process of claim 1, wherein the $H_2/CO$ ratio of the produced syngas is 1.5 to 3.0.

* * * * *